United States Patent [19]

Miller

[11] 4,092,649

[45] May 30, 1978

[54] THERMOGRAPHIC RECORDER ENERGIZING ITS HEATED STYLUS INDEPENDENTLY OF STYLUS RESISTANCE

[75] Inventor: Robert Leroy Miller, Horsham, Pa.

[73] Assignee: Honeywell Inc., Minneapolis, Minn.

[21] Appl. No.: 782,730

[22] Filed: Mar. 30, 1977

[51] Int. Cl.² .............................................. G01D 15/10
[52] U.S. Cl. .................................. 346/76 R; 219/216; 219/501
[58] Field of Search .............. 346/76 R; 219/216, 501

[56] References Cited
U.S. PATENT DOCUMENTS

| | | | |
|---|---|---|---|
| 3,699,588 | 10/1972 | Eck | 346/76 R X |
| 3,813,677 | 5/1974 | Shimotsuma | 346/76 R |

*Primary Examiner*—Joseph W. Hartary

*Attorney, Agent, or Firm*—Laurence J. Marhoefer; Lockwood D. Burton; George E. Bodenstein

[57] ABSTRACT

The recorder includes a heated stylus which is positioned across a heat-sensitive chart by a servo motor to make the stylus position follow the value of an input signal applied to a servo balancing comparing and driving circuit for the motor. A switching circuit, actuated by the pulse signal output of a pulse generator, interconnects the stylus heater, a capacitor, and a source of capacitor charging energy. The switching circuit alternately charges the capacitor from the source and discharges the capacitor into the stylus heater. This causes the stylus to produce a recorded trace on the chart having an intensity which is substantially independent of the resistance of the stylus heater over a given resistance range.

10 Claims, 4 Drawing Figures

THERMOGRAPHIC RECORDER ENERGIZING ITS HEATED STYLUS INDEPENDENTLY OF STYLUS RESISTANCE

BACKGROUND OF THE INVENTION

1. FIELD OF THE INVENTION

The present invention relates generally to recording apparatus or recorders of the so-called thermographic or heated stylus type, wherein an electrically heated stylus, also known as a hot pen, marks or produces a trace on a heat-sensitive record medium in accordance with data to be recorded. Specifically, the invention relates to the electrical apparatus and circuitry which are employed to control the energization of the heaters of such heated styli in such recorders.

2. DESCRIPTION OF THE PRIOR ART

Various forms of recorders employing heated styli, and various forms of such styli, have been proposed in the past for various applications. Examples of different forms of such known recorders, heated styli, and/or stylus heater energizing circuits are found in the Rich U.S. Pat. No. 3,002,802, the Bjork U.S. Pat. No. 3,438,056, the Phillips et at U.S. Pat. No. 3,689,937, the Eck et al U.S. Pat. No. 3,699,588, and the Shimotsuma U.S. Pat. No. 3,813,677.

Among the various forms of heated styli which have been employed in the known forms of heated stylus recorders, the heated tip or hot tip type of stylus has proved to be quite attractive and hence quite popular. This is particularly true of the form of hot tip stylus which is shown in the above-noted Eck et al patent. This popularity of the hot tip type of stylus has been due, at least in part, to its low thermal inertia and hence fast response, which give this type of stylus, among other things, the ability to provide intermittent or interrupted records or traces without the need for pen lifters or other mechanical trace-interrupting devices.

The desirable characteristics of the hot tip stylus are due, at least in part, to its marking or writing tip being the heating element or heater of the stylus. In the Eck et al. form of stylus, for example, the stylus consists of a ceramic mandrel having a dome-shaped end or tip which carries a coating or deposit of electrical resistance material, such as a ceramic ink. A pair of flexible electrical conductors connects this coating to a suitable source of electrical energy so that this coating constitutes the stylus heater. The electrical resistance of such a coating will be referred to herein as the stylus heater resistance, or simply as the heater resistance.

The stylus is so mounted and supported in its recorder carriage that the noted coating is maintained in appropriate thermal contact with the associated heat-sensitive record medium as the stylus is moved and positioned along its path of travel across the medium. When it is desired to have the stylus mark the medium, a voltage from the noted source is applied across the flexible conductors and the coating, causing the latter to become sufficiently hot to provide the desired marking and recorded trace.

The operational goal of a heated stylus recorder is that it produce a trace of consistently uniform density or intensity and appearance whenever the stylus heater is energized to place the stylus in the writing condition. This requires that the input power to the heater or the heater power be maintained at the value which produces the desired trace intensity for the prevailing conditions of record medium speed, stylus speed, etc. This, in turn, requires that the heater energizing voltage and current be continuously kept commensurate with the heater resistance as needed to provide the desired value of heater power. For simplifying the present description, the latter will refer to the adjustment of the heater energization or the heater voltage as the adjustment which keeps the heater power at the desired value for different heater resistances.

For a stylus of the above-described type, the heater resistance increases progressively as the stylus wears in use, since stylus wear means wear and erosion of the heater. Consequently, in order to keep the recorded trace intensity consistenly uniform in the presence of such increasing heater resistance, and thus prevent trace degradation, it is necessary to adjust the heater energization correspondingly as the stylus wears.

Additionally, it has been found to be impractical, due to the costs involved, to produce the desirable styli of the above-described coated tip type with a sufficiently consistent heater resistance from unit to unit to assure that such styli can be placed or interchanged in the known recorders without requiring a heater energization adjustment to be made at the appropriate time in order to secure or preserve the uniformity of the produced trace. This variation in heater resistance from stylus to stylus is believed to be due to the nature of the electrical resistance material which is employed, and the manner in which it is used, in the manufacture of the styli.

For all of the known forms of heated stylus recorders and their stylus heater energizing circuits, the above-described heater energization adjustments, to secure and/or preserve uniform trace intensity for different heater resistances, must be made manually. The reason for this is that none of the known recorders automatically adjusts its stylus heater energization to compensate for differences in heater resistance to the end of maintaining a uniform trace intensity notwithstanding such resistance differences.

The above-described requirement for manual heater energization adjustment imposed by the known recorders amounts to a practical problem for several reasons. In the first place, this requirement means that, to prevent trace degradation with stylus use, the known recorders must be continually manually adjusted to maintain the proper heater input power as their styli wear. Additionally, said requirement adds to the cost of producing such a recorder, since it necessitates the manual adjustment of the heater energization in each recorder individually after its stylus is installed. More seriously, said requirement imposes a substantial burden on a user of such a recorder when it becomes necessary to replace the stylus in the field, where the needed manual heater energization adjustment to match the resistance of the new stylus must generally be carried out on a trial-and-error basis.

Since it is impractical to so carry out the above-noted stylus manufacturing process as to keep the heater resistances sufficiently uniform from stylus to stylus to obviate the need for manually adjusting the stylus heater energization in the known recorders to match the particular stylus being used, and since it is clearly disadvantageous to have to make such manual heater energization adjustments, as well as those required to compensate for stylus use and wear, the failure of the known recorders to effect automatic compensation for differences in stylus heater resistance amounts to a series shortcoming of such recorders.

In summary, the known heated stylus recorders, when employing the desirable type of heated stylus described above, are characterized by a shortcoming which results in three significant drawbacks. The first of these is the necessity for manually adjusting each recorder at the time of its production to match the resistance of the particular stylus which is initially incorporated in the recorder. The second of these is the necessity for manually adjusting a recorder in the field when it is necessary to replace its stylus. The third of these is the necessity for manually adjusting the recorder to offset the progressive change in stylus resistance and accompanying degradation of the recorded trace which occurs as the stylus wears. While the first two of these drawbacks could be avoided to some extent by utilizing manufacturing techniques which narrow the resistance spread of the manufactured styli, such techniques make the styli unduly costly.

SUMMARY OF THE INVENTION

Accordingly, it is an object of the present invention to provide an improved heated stylus recorder which overcomes the noted shortcoming of the known recorders. A more specific object of the invention is to provide such an improved recorder wherein the stylus is provided with a desired value of heater power for different stylus resistances without requiring any manual adjustments to be made. A still more specific object of the invention is to provide such an improved recorder wherein a stylus heater energizing circuit automatically adjusts the energization of the heater, as the heater resistance is changed or varies, so as to maintain the heater power at the value which produces the desired trace intensity.

To the end of accomplishing the above-noted and other desirable objects, the improved recorder according to the present invention includes a novel stylus heater energizing circuit. This circuit is characterized by applying an energizing voltage to the heater during each of a succession of heater energizing periods. In each of those periods, the average value of the energizing voltage is made to be such a function of the heater resistance that the total energy supplied to the heater during each of those periods is substantially independent of the heater resistance over a predetermined range of values of the latter. Specifically, the higher the heater resistance is, the higher the circuit makes the average value of the energizing voltage as necessary to keep the heater power substantially constant at the desired value. In a preferred form of this improved recorder, the proper average value of heater voltage is applied to the heater by the use of switching means which alternately charge a capacitor and discharge it into the heater.

BRIEF DESCRIPTION OF THE DRAWINGS

A better understanding of the present invention may be had from the following detailed description when read in connection with the accompanying drawings, wherein.

DETAILED DESCRIPTION OF THE PREFERRED EMBODIMENT

THE APPARATUS OF FIG. 1

Figure 1:
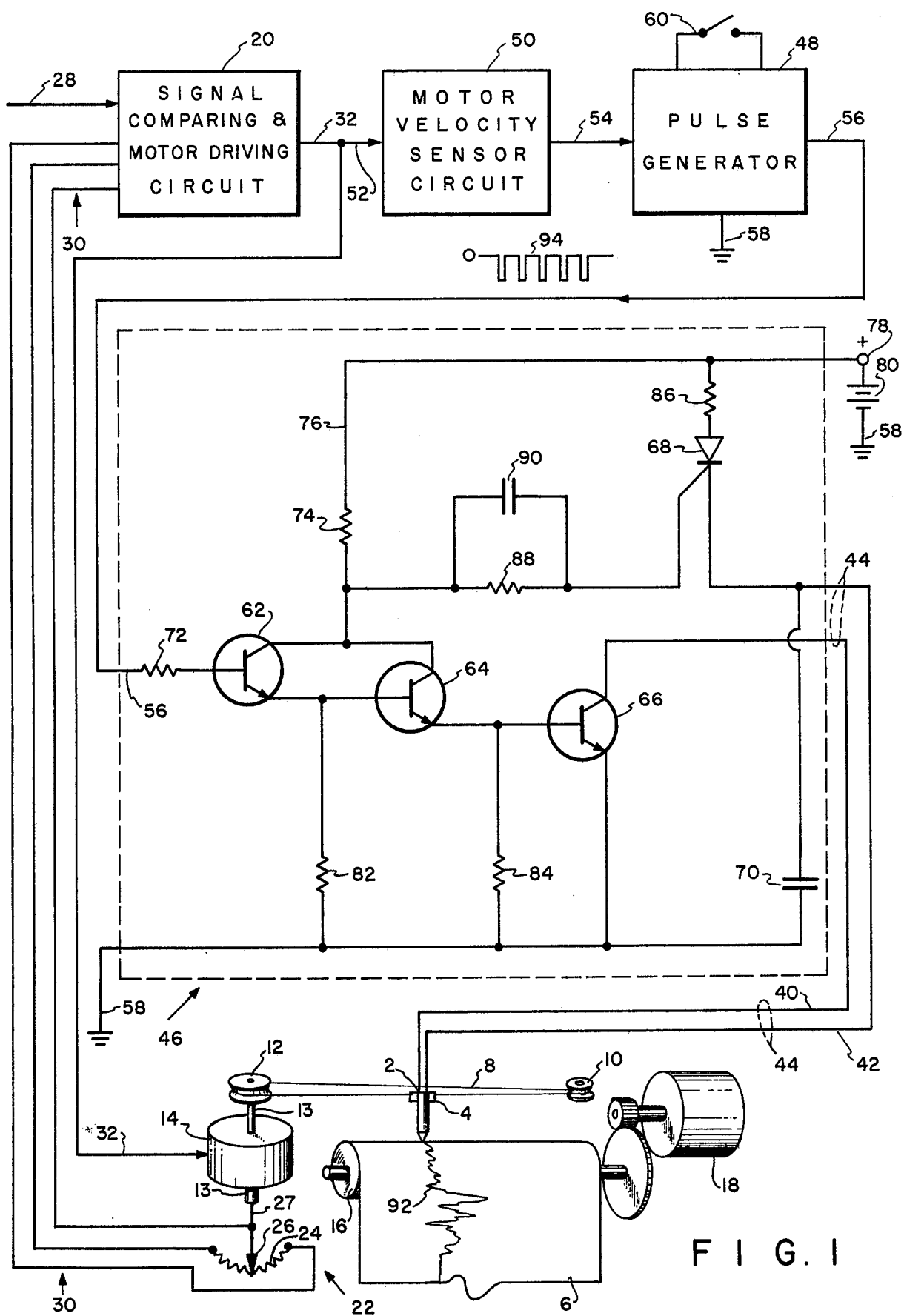
FIG. 1 is a diagrammatic representation of thermographic recording apparatus including a stylus heater energizing circuit arrangement embodying the present invention.

The apparatus shown in FIG. 1, and illustrating a preferred example of the above-noted improved heated stylus recorder embodying the present invention, is designed to provide a recorded trace on a moving heat-sensitive record medium or chart, said trace representing the value of a variable input signal as that value varies with time. The FIG. 1 recorder is of the so-called servo balancing type, wherein a servo or balancing motor continually readjusts the position of the stylus in its path across the chart as necessary to maintain a comparing and motor driving circuit in balance, and hence as necessary to cause the stylus position to follow the value of the input signal.

In accordance with the foregoing, the FIG. 1 recorder includes a heated stylus 2 which is mounted and supported in a carriage 4. The latter may well be of the form shown in the above-noted Eck et al patent, and is arranged to be moved back and forth in a path across the width of a heat-sensitive chart 6 by an endless drive belt 8. The latter passes around an idler pulley 10 and a motor pulley 12, and is in driven engagement with the latter. The pulley 12 is secured to the shaft 13 of a servo motor 14. The clockwise rotation of the shaft 13 and the pulley 12 moves the stylus 2 to the left across the chart 6, and the counter-clockwise rotation of the shaft 13 and the pulley 12 moves the stylus 2 across the chart 6 to the right. The chart 6 is moved downward at a desired rate from a supply roll 16, by the action of a chart driving motor 18, to provide the usual time axis of the recorded trace. The carriage 4 maintains the writing tip of the stylus 2 in appropriate thermal contact with the chart 6 as the stylus 2 is moved and positioned along its path of travel across the chart 6 by the driving action of the motor 14.

The FIG. 1 recorder also includes a signal comparing and motor driving circuit 20, and a balancing element which is shown as a slidewire resistor 22. The latter has a resistor body 24, and has a contact 26 which is mechanically coupled by a linkage 27 to the shaft 13 of the motor 14 so as to be positioned along the resistor body 24 in synchronism with the positioning of the stylus 2 across the chart 6.

An input signal, the value of which is to be recorded as that value varies with time, is applied to the circuit 20 by way of an input connection 28. The body and contact of the slidewire resistor 22 are connected to the circuit 20 by conductors 30. The motor-driving output portion of the circuit 20 is connected to the motor 14 by an output connection 32, whereby the motor drive signal developed by the circuit 20 is applied to the motor 14.

It is deemed that no further description of the construction of the stylus-positioning servo balancing portion of the FIG. 1 recorder is necessary herein, since such arrangements are well known in the art. For example, the arrangement which has just been described may well be of the form shown in the Newbold U.S. Pat. No. 3,421,082.

The FIG. 1 recorder also includes components and circuitry which supply and control the energization of the heater of the stylus 2. To make the description of said components and circuitry more meaningful, it will be assumed that the stylus 2 has the specific form which is illustrated by way of example in FIG. 2.

Figure 2:
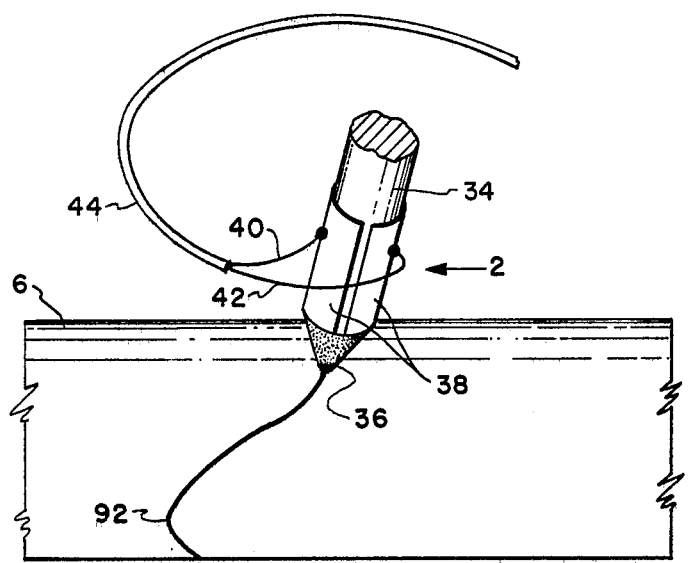
FIG. 2 is a diagrammatic representation of one desirable form which the heated stylus of the FIG. 1 apparatus may take.

The form of stylus illustrated in FIG. 2 is that which is disclosed in the above-noted Eck et al patent, and includes an electrically insulating mandrel 34 having a dome-shaped writing tip which carries a coating or deposit 36 of electrical resistance material. The coating 36 forms the heater of the stylus 2. The electrical energizing connections to the coating or heater 36 include a pair of electrically conducting strips 38 which are deposited on the mandrel 34 so as to contact the heater 36 at suitable points. Said electrical connections also include two flexible electrical conductors 40 and 42, each of which is electrically connected to a corresponding one of the strips 38. The conductors 40 and 42 are housed within a flexible jacket 44 to make up a two-conductor flexible cable assembly.

The above-mentioned components which supply and control the energization of the stylus heater 36 include a stylus heater energizing circuit 46 which receives the pulse signal output of a pulse generator 48. The frequency of the pulse signal produced by the pulse generator 48 is controlled by a signal from a motor velocity sensor circuit 50, which, in turn, is controlled by the motor drive signal appearing on the connection 32. Specifically, the connection 32 is connected to the input of the velocity sensor circuit 50 by a connection 52, and the output of the velocity sensor circuit 50 is connected by a connection 54 to the input of the pulse generator 48, which input controls the frequency of the generator output signal. The latter is applied to the circuit 46 by way of a generator output connection 56 and a common or ground connection 58. The pulse generator 48 is equipped with a switch 60 which permits the production of the pulse signal on the output connection 56 to be started and stopped.

The stylus heater energizing circuit 46 includes a first transistor 62, a second transistor 64, a third transistor 66, a silicon controlled rectifier (SCR) 68, a capacitor 70, and several other components to be described below. In the circuit 46, the connection 56, carrying the pulse signal from the pulse generator 48, is connected through an input resistor 72 to the base of the transistor 62. The collector of the transistor 62 is connected through a collector resistor 74 and a positive supply conductor 76 to the positive terminal 78 of a source of D.C. energizing voltage, shown as a battery 80. The negative terminal of the latter is connected to the common connection 58.

The emitter of the transistor 62 is connected through an emitter resistor 82 to the common connection 58, and is also connected to the base of the transistor 64. The collector of the latter is connected to the collector of the transistor 62. The emitter of the transistor 64 is connected through an emitter resistor 84 to the common connection 58, and is also connected to the base of the transistor 66. The emitter of the transistor 66 is connected to the common connection 58, and the collector of the transistor 66 is connected to the stylus heater energizing conductor 40.

The anode of the SCR 68 is connected through an anode resistor 86 to the positive supply conductor 76. The cathode of the SCR 68 is connected to the upper terminal of the capacitor 70 and to the stylus heater energizing conductor 42. The lower terminal of the capacitor 70 is connected to the common connection 58.

By virtue of the above-described connections, the capacitor 70 has a charging circuit or path which can be traced from the positive supply terminal 78 and through the resistor 86, the anode-cathode path of the SCR 68, and the capacitor 70 to the common connection 58. Also, the capacitor 70 has a discharge circuit or path which can be traced from the upper terminal of the capacitor 70 and through the conductor 42, the stylus heater 36, the conductor 40, and the collector-emitter path of the transistor 66 to the lower terminal of the capacitor 70.

The SCR 68 is controlled by the conductivity of the transistors 62 and 64 such that, when these transistors turn off, the SCR 68 is turned on. Specifically, the gate of the SCR 68 is connected through a resistor 88 and a parallel-connected capacitor 90 to the collectors of the transistors 62 and 64.

THE OPERATION OF THE APPARATUS OF FIG. 1

In the following description, the operation of the servo portion of the FIG. 1 recorder will be described first. To this end, it is noted that, when an input signal is aplied over the connection 28 to the input of the circuit 20, the latter compares the value of that signal to the value of a balancing signal within the circuit 20 which represents the existing position of the contact 26 on the resistor body 24. The balancing signal, therefore, represents the existing position of the stylus 2 in its path across the chart 6. If those compared signals are equal, no signal is applied over the connection 32 to the motor 14, since the existing position of the stylus 2 is then the correct position corresponding to the existing value of the input signal on the connection 28.

If the compared signals are not equal, however, the circuit 20 produces a suitable motor drive signal on the connection 32 which causes the motor 14 to rotate and to move both the contact 26 on the resistor body 24, and the stylus 2 along its path in the direction toward the position which corresponds to the existing value of the input signal. When the motor 14 has moved the stylus 2 and the contact 26 to the position at which the compared signals become equal, the motor drive signal is terminated, and the stylus 2 now occupies the position corresponding to the existing value of the input signal. In this way, the position of the stylus 2 on the chart 6 is continuously readjusted as necessary to make this stylus position follow the value of the input signal.

The operation of the stylus heater energizing portion of the FIG. 1 recorder will now be described. Briefly, when it is desired to have the stylus 2 mark the chart 6, and hence to produce a recorded trace or record of the stylus position and hence the value of the input signal which is present on the connection 28, the switch 60 is moved to the closed position. This causes the pulse generator 48 to supply the above-noted pulse signal over the connection 56 to the base of the transistor 62. This, in turn, causes the circuit 46 to energize the stylus heater 36 to place the stylus in the marking or writing condition. With the chart drive motor 18 in operation, the stylus 2 then produces the desired recorded trace on the chart 6, such as the trace shown by way of example at 92. The stylus 2 continues to so record on the chart 6 until the switch 60 is subsequently opened.

The pulse signal produced by the generator 48 on the connection 56, when the switch 60 is closed, consists of negative pulses or pulse periods alternating with periods in which the value of the signal is zero. A typical example of that signal, for a typical, constant value of the signal on the connection 54, is shown by the waveform curve 94 which is provided in FIG. 1 above the connection 56. For convenience, this pulse signal on the connection 56 will be referred to hereinafter as the signal 94.

As was noted above, the frequency of the signal 94 is controlled by the output signal of the velocity sensor circuit 50, which signal appears on the connection 54. The operation of the circuit 50 will be described in more detail hereinafter. For the present description, it will be assumed that the signal on the connection 54 has the above-noted typical, constant value, that the frequency of the signal 94 on the connection 56 has a corresponding constant value, that the resistance of the stylus heater 36 is constant at a typical intermediate value, and that the component values and voltages in the circuit 46 are such that the resulting trace 92 is of the appropriate intensity for the existing conditions.

The operation of the circuit 46 in energizing the stylus heater 36 in the presence of the signal 94 for the assumed constant conditions is the same from cycle to cycle of the signal 94, each of such cycles consisting of one of the pulse portions of the signal 94 and the succeeding zero signal portion. Therefore, it is sufficient herein, in describing that operation, to describe it as it occurs during any one of those cycles. This will be done with reference to the curves or waveforms of FIG. 3. Those curves show typical variations with respect to time of several quantities and conditions within the circuit 46 as they would occur during any pair of said cycles following the closure of the switch 60. The first of the illustrated cycles is shown as occurring between a time T1 and a time T4, and the succeeding cycle is shown as occurring between the time T4 and a time T7.

Figure 3:
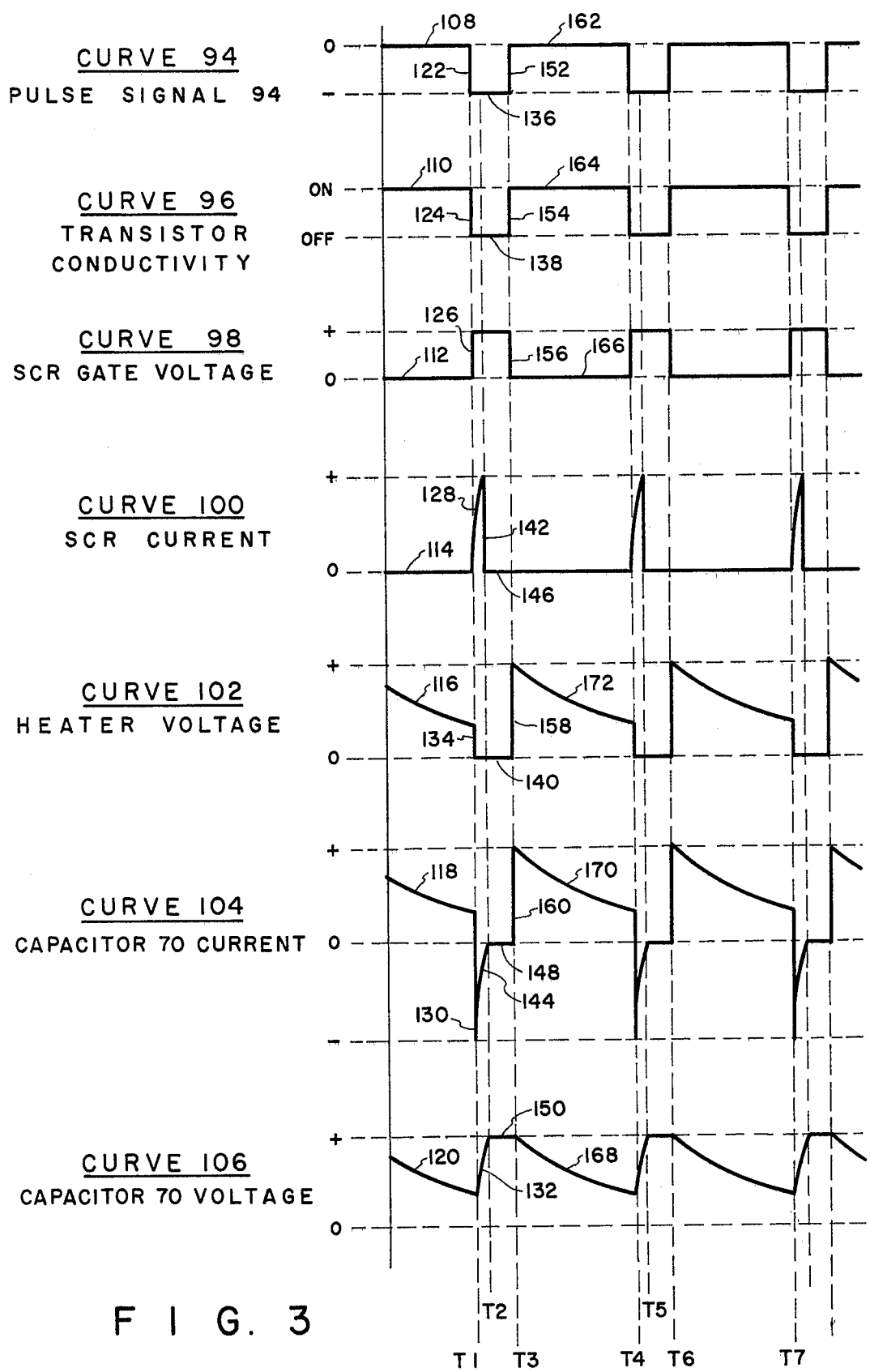
FIG. 3 is a series of curves illustrating the operation of the FIG. 1 apparatus for a typical situation.

FIG. 3 includes a curve 94 which is an enlarged portion of the curve 94 of FIG. 1, and which shows the noted two cycles of the signal 94 occurring between the times T1 and T7. FIG. 3 also includes a curve 96, which shows the conductive state of the transistors 62, 64 and 66; a curve 98, which shows the voltage on the gate of the SCR 68; a curve 100, which shows the current flow in the anode-cathode path of the SCR 68; a curve 102, which shows the voltage across the stylus heater 36; a curve 104, which shows the current of the capacitor 70; and a curve 106 which shows the voltage between the top and bottom terminals of the capacitor 70.

With reference to the above-noted curves, it is seen that, just previous to the time T1, the signal on the base of the transistor 62 is zero, as is shown by the portion 108 of the curve 94. Accordingly, at that time, the transistor 62, 64, and 66 are on and conducting, as is shown by the portion 110 of the curve 96. As a result, the gate voltage of the SCR 68 is substantially zero, as is shown by the portion 112 of the curve 98, the SCR 68 is off, and there is thus no current flow through the SCR 68 at this time, as is shown by the portion 114 of the curve 100. Further, since the transistor 66 is on at this time, the capacitor 70 is effectively connected in its discharge circuit across the stylus heater 36, causing the heater voltage, the capacitor 70 current, and the capacitor 70 voltage to have the values shown by the respective curve portions 116, 118, and 120 of the respective curves 102, 104, and 106.

At the time T1, the signal 94 drops rapidly to its negative pluse value, as is shown by the portion 122 of the curve 94. This turns off the transistors 62, 64, and 66, as is shown by the portion 124 of the curve 96. With the transistors off, the gate voltage of the SCR 68 rises to a positive value, as is shown by the portion 126 of the curve 98. This, in turn, turns on the SCR 68, which now completes the capacitor charging circuit and passes a charging current into the capacitor 70. With respect to the SCR 68, this charging current rises from the time T1, as is shown by the portion 128 of the curve 100. Since this current is a capacitor charging current, it rises exponentially, as shown. Since this current is opposite in direction to the discharge current which was previously flowing from the capacitor 70 as shown by the curve portion 118, the capacitor current of the curve 104 rapidly falls to a negative value at the time T1 and then increases exponentially, as is shown by the curve portion 130. As the capacitor charging current so increases, the capacitor voltage of the curve 106 similarly increases exponentially, as is shown by the curve portion 132. The turning off of the transistor 66 at the time T1 causes the stylus heater and capacitor discharge circuit to be opened, and thus causes the heater voltage of the curve 102 to drop to zero, as is shown by the curve portion 134.

Following the time T1, the signal 94 remains at its negative pulse value, as is shown by the curve portion 136, the transistors 62, 64, and 66 remain off, as is shown by the curve portion 138, and the voltage across the stylus heater 36 remains at zero, as is shown by the curve portion 140. The SCR and capacitor charging current continues to rise following the time T1 until the capacitor voltage has risen along the curve portion 132 to that value which so raises the voltage on the cathode of the SCR 68 that the latter turns off. This is shown as ocurring at a time T2. At the time T2, therefore, the SCR and capacitor charging current goes rapidly to zero, as is shown by the respective curve portions 142 and 144. Following the time T2, therefore, the SCR and capacitor current is zero, as is shown by the respective curve portions 146 and 148, and the capacitor voltage levels off at a corresponding positive value, as is shown by the curve portion 150.

The last described conditions prevail until the time T3, at which time the pulse portion of the signal 94 ends and that signal returns to its zero value, as is shown by the curve portion 152. At the time T3, therefore, the transistors 62, 64, and 66 turn on, as is shown by the curve portion 154, and the gate voltage of the SCR 68 returns substantially to zero, as is shown by the curve portion 156. The turn-on of the transistor 66 reconnects the stylus heater 36 across the capacitor 70 to complete the capacitor discharge and heater energizing circuit, whereby the heater voltage rises to the capacitor voltage, as is shown by the curve portion 158. A capacitor discharge current now appears, as is shown by the curve portion 160.

Following the time T3, the signal 94 remains at zero, as is shown by the curve portion 162, the transistors 62, 64, and 66 remain on, as is shown by the curve portion 164, the SCR gate voltage remains low, as is shown by the curve portion 166, the SCR 68 remains off, as is shown by the curve portion 146, and the heater energizing period proceeds. Since the stylus heater 36 is now receiving energy from the capacitor 70, by way of the capacitor discharge current, the capacitor voltage, the capacitor current, and the heater voltage all decrease exponentially, as is shown by the respective curve portions 168, 170, and 172.

The last-noted conditions, and the energized state of the stylus heater, continue until a time T4, at which time the signal 94 reaches the end of the described one of its cycles and goes negative to start the succeeding cycle. At that time, the transistors 62, 64, and 66 again turn off, turning on the SCR 68 to start the next capacitor charging period T4-T5, and opening the stylus heater circuit to end the heater energizing period T3-T4. From the time T4 to the time T7, the second cycle of the signal 94 causes the circuit 46 to repeat the described actions which took place during the first cycle from the time T1 to the time T4. Those actions are then repeated for the ensuing cycles of the signal 94 until the switch 60 is opened to terminate the recording operation.

It is seen from the foregoing description, therefore, that the circuit 46 and the generator 48 cooperate to form a switching arrangement which charges the capacitor 70 from the source 80 during first alternate charging periods, such as the periods T1-T2, and T4-T5, which intervene with second alternate heater energizing periods, such as the periods T3-T4 and T6-T7, in which the switching arrangement discharges the capacitor 70 into the stylus heater 36. As shown, the parameters of the arrangement are so chosen that the capacitor 70 is fully charged during each of the charging periods, but is not completely discharged during the intervening heater energizing periods.

The foregoing explanation has dealt with the operation of the FIG. 1 apparatus in the presence of one, fixed value of the stylus heater resistance. That value was assumed to be an intermediate value in the range of the values which the heater resistance is likely to have in practice. The way in which that apparatus also operates in the described manner to furnish substantially the same power to the heater in the presence of different values of heater resistance in said range will now be described. This will be done with reference to the curves of FIG. 4.

Figure 4:
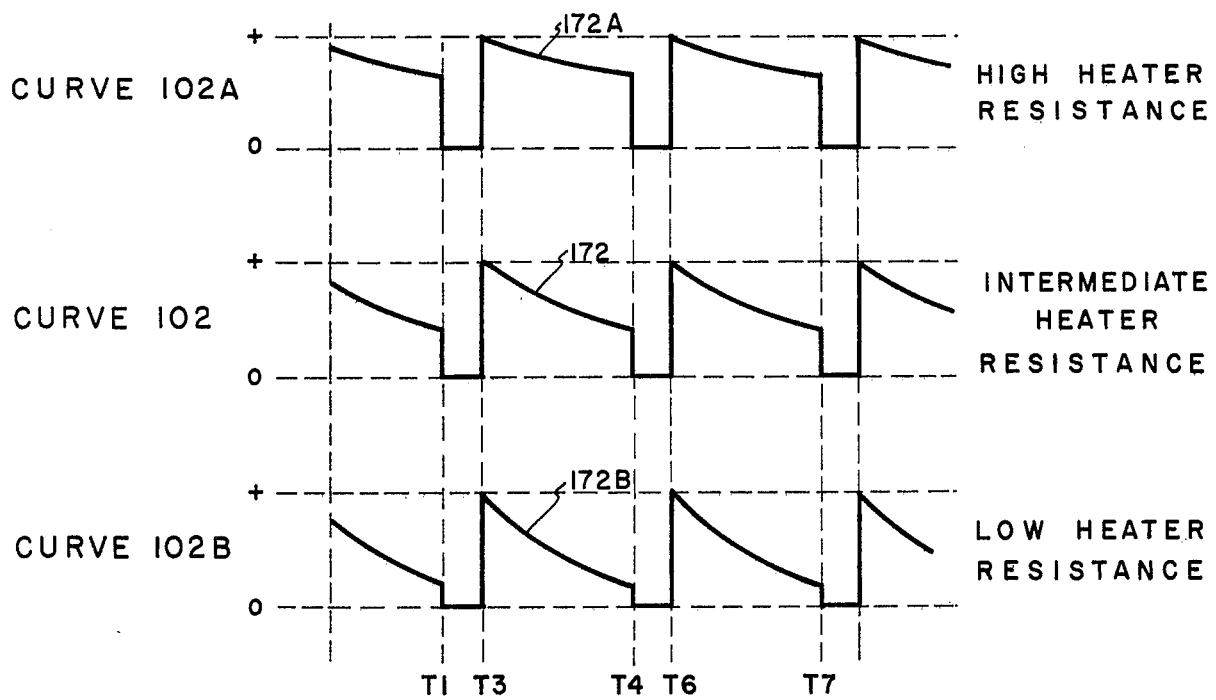
FIG. 4 is a series of curves illustrating the operation of the FIG. 1 apparatus for three different values of stylus heater resistance.

FIG. 4 includes the heater voltage curve 102 of FIG. 3, and also includes similar heater voltage curves 102A and 102B. As the curve 102 shows the apparatus operation for an intermediate value of heater resistance, so the curves 102A and 102B show that operation for the respective upper limit and lower limit heater resistance values of said range. It will be shown in the following explanation that the curves 102, 102A, and 102B demonstrate that the FIG. 1 apparatus automatically furnishes substantially the same heater energy per cycle of the signal 94, and hence substantially the same heater power, in the presence of all heater resistance values lying in said range, and that said energy and power are thus substantially independent of the heater resistance over said range.

Each of the curve portions 172, 172A, and 172B of FIG. 4 shows the fact that the voltage applied across the stylus heater 36 decreases exponentially during each of the heater energizing periods as the capacitor 70 discharges. Those curve portions also show the fact that the rate at which this heater voltage decreases is an inverse function of the existing value of the heater resistance. Thus, the higher the heater resistance is in any given heater energizing period, the correspondingly lower is the rate at which the heater voltage decreases in that period.

As a result of the existence of the relationships just described, the square of the average value of the heater voltage in any given energizing period is a direct function of the heater resistance in that period. Thus, as can be seen by comparing the areas under the curve portions 172, 172A, and 172B in FIG. 4, the higher said resistance is, the correspondingly higher is said squared average heater voltage. Actually, said squared average heater voltage is substantially porportional to said resistance. Consequently, in each heater energizing period, the ratio of said squared average heater voltage to said resistance, which ratio represents the energy supplied to the heater and the heater power, is substantially equal to a constant.

The result of the foregoing is that the energy supplied to the heater in each heater energizing period is substantially independent of the heater resistance over the noted range. Since the heater energy per heater energizing period is so independent of the heater resistance, the power supplied to the heater is likewise independent of the heater resistance. Thus, the described apparatus accomplishes the stated object of automatically making the average heater voltage such a function of the heater resistance that the heater energy per heater energizing period, and hence the heater power, are made to be substantially independent of the heater resistance over the noted range thereof.

In the foregoing description, it was assumed that the signal on the connection 54 to the pulse generator 48 was constant at a typical value. The significance of that signal, and the effect which its value has on the operation of the circuit 46, will now be described in connection with a description of the nature and operation of the motor velocity sensor circuit 50.

By way of the connection 52, the circuit 50 receives a signal which is a function of the velocity with which the motor shaft 13 is rotating, and which is, therefore, a function of the velocity with which the stylus 2 is moving across the chart 6. In response to this signal on the connection 52, the circuit 50 makes the value of the above-noted signal on the connection 54 to be porportional to the stylus velocity. That signal, in turn, makes the frequency of the signal 94 porportional to the stylus velocity. As a result, the circuit 46 produces proportionally more stylus heater energizing periods per unit time as the stylus velocity increases, and vice-versa. This is done to make the heater power a function of the stylus velocity as necessary to make the recorded trace intensity independent of the stylus velocity. If the circuit 50 and its connections were not provided in the FIG. 1 apparatus, and the signal 94 had a constant frequency, a stylus heater power which was adequate for an average stylus velocity would produce too dark a trace for a relatively low stylus velocity, and too light a trace for a relatively high stylus velocity. Examples of known arrangements for making a recorded trace intensity independent of the stylus velocity are shown in the above-noted Shimotsuma, Phillips et al, and Bjork patents.

By way of illustration and example, and not by way of limitation, it is noted that, in a constructed embodiment of apparatus of the form shown in FIG. 1, the circuit components and voltages had the following values:

| | |
|---|---|
| Resistance of stylus heater 36 | 100 ohms to 180 ohms. |
| Pulse generator 48 | Type 555 timer chip. |
| Transistors 62 and 64 | Type 2N3417. |
| Transistor 66 | Type 2N3053. |
| SCR 68 | General Electric Co. Type C106. |
| Capacitor 70 | 10 mf., 50 volts. |

-continued

| | |
|---|---|
| Resistor 72 | 820 ohms. |
| Resistor 74 | 5.6K ohms. |
| Voltage at terminal 78 | 30-40 volts. |
| Resistors 82 and 84 | 1K ohms. |
| Resistor 86 | 5 ohms. |
| Resistor 88 | 100 ohms. |
| Capacitor 90 | 0.1 mf., 50 volts. |
| Frequency of signal 94 | Around 250 Hz. |

It is believed to be clear from the foregoing description that the described apparatus according to the present invention fulfills the objects stated herein. Thus, it has been shown that the apparatus automatically causes the recorded trace produced by the stylus 2 to have an intensity which is substantially independent of the resistance of the stylus heater over a predetermined range of values of that resistance, whereby manual adjustments to compensate for different values of that resistance are not required.

The embodiments of the invention in which an exclusive property or privilege is claimed are defined as follows:

1. In a thermographic recorder including an electrically heated stylus having a heater and being arranged to mark a heat-sensitive record medium when said heater is energized, the improved energizing circuit for said heater including means connected across said heater for applying a voltage across said heater for each of a succession of heater enegizing periods, said means including further means for making the average value of said voltage during each of said periods to be a function of the value of the electrical resistance of said heater which causes the total energy supplied to said heater during each of said periods, and hence the power supplied to said heater, to be substantially independent of said heater resistance value over a predetermined range thereof.

2. In a thermographic recorder including an electrically heated stylus having a heater and being arranged to mark a heat-sensitive record medium when said heater is energized, the improvement comprising
   a capacitor, and
   switching means connected to a source of electrical energy, to said capacitor, and to said heater for charging said capacitor from said source during first alternate periods which intervene with second alternate periods in which said switching means discharges said capacitor into said heater,
   whereby energy is supplied to said heater during each of said second periods at a rate which is substantially independent of the value of the electrical resistance of said heater over a predetermined range thereof.

3. In a thermographic recorder including an electrically heated stylus having a heater and being arranged to mark a heat-sensitive record medium when said heater is energized, the improvement comprising
   a capacitor, and
   switching means connected to a source of electrical energy, to said capacitor, and to said heater for connecting said capacitor to said source, to place a predetermined charge on said capacitor, during a first period, for connecting said capacitor to said heater, to only partly discharge said capacitor into said heater, during a second period, and for repeating said first and second periods alternately to supply energy to said heater at a rate which is substantially independent of the value of the electrical resistance of said heater over a predetermined range thereof.

4. In a thermographic recorder including an electrically heated stylus having a heater and being arranged to mark a heat-sensitive record medium when said heater is energized, the improvement comprising
   a capacitor, and
   switching means connected to a source of electrical energy, to said capacitor, and to said heater for alternately charging said capacitor from said source and discharging said capacitor into said heater at a discharge rate which is an inverse function of the value of the electrical resistance of said heater to make the square of the average value of the resulting voltage across said heater substantially proportional to said value of said resistance, thereby to supply energy to said heater at a rate which is substantially independent of said value of said resistance over a predetermined range thereof.

5. In a thermogrpahic recorder including an electrically heated stylus having a heater and being arranged to mark a heat-sensitive record medium when said heater is energized, the improvement comprising
   a capacitor,
   switching means connected to a source of electrical energy, to said capacitor, and to said heater, and having a first state in which said switching means connects said capacitor to said source in a capacitor charging path, and having a second state in which said switching means interrupts said charging path and connects said capacitor to said heater in a capacitor discharge and heater energizing path, and
   means connected to said switching means to cause the latter to occupy said first state for alternate periods in each of which said capacitor acquires substantially the same charge from said source, and to cause said switching means to occupy said second state in each of intervening periods in which said capacitor discharges only partially and at a rate which is an inverse function of the value of the electrical resistance of said heater,
   whereby energy is supplied to said heater at a rate which is substantially independent of said value of said resistance over a predetermined range thereof.

6. Apparatus for energizing the heater of an electrically heated trace-recording stylus, comprising means connected across said heater for applying a voltage across said heater for each of a succession of heater energizing periods, said means including further means for making the average value of said voltage during each of said periods to be a function of the value of the electrical resistance of said heater which causes the total energy supplied to said heater during each of said periods, and hence the power supplied to said heater, to be substantially independent of said heater resistance value over a predetermined range thereof.

7. Apparatus for energizing the heater of an electrically heated trace-recording stylus, comprising
   a capacitor, and
   switching means connected to a source of electrical energy, to said capacitor, and to said heater for charging said capacitor from said source during first alternate periods which intervene with second alternate periods in which said switching means discharges said capacitor into said heater,
   whereby energy is supplied to said heater during each of said second periods at a rate which is substantially independent of the value of the electrical resistance of said heater over a predetermined range thereof.

8. Apparatus for energizing the heater of an electrically heated trace-recording stylus, comprising a capacitor, and switching means connected to a source of electrical energy, to said capacitor, and to said heater for fully charging said capacitor from said source during each of first alternate periods which intervene with second alternate periods in which said switching means only partially discharges said capacitor into said heater at a rate which is an inverse function of the value of the electrical resistance of said heater, whereby energy is supplied to said heater during each of said second periods at a rate which is substantially independent of said value of said resistance over a predetermined range thereof.

9. Apparatus for energizing the heater of an electrically heated trace-recording stylus having an electrical heater resistance value which is subject to variation, said apparatus comprising a capacitor, and switching means connected to a source of electrical energy, to said capacitor, and to said heater for alternately charging said capacitor from said source and discharging said capacitor into said heater at a discharge rate which is an inverse function of said resistance value to make the square of the average value of the resulting voltage across said heater substantially porportional to said resistance value, thereby to supply energy to said heater at a rate which is substantially independent of said resistance value over a predetermined range thereof.

10. Apparatus for energizing the heater of an electrically heated trace-recording stylus having an electrical heater resistance value which is subject to variation, said apparatus comprising a capacitor, switching means connected to a source of electrical energy, to said capacitor, and to said heater, and having a first state in which said switching means connects said capacitor to said source in a capacitor charging path, and having a second state in which said switching means interrupts said charging path and connects said capacitor to said heater in a capacitor discharge and heater energizing path, and means connected to said switching means to cause the latter to occupy said first state for alternate periods in each of which said capacitor acquires substantially the same charge from said source, and to cause said switching means to occupy said second state in each of intervening periods in which said capacitor discharges only partially and at a rate which is an inverse function of said resistance value, whereby energy is supplied to said heater at a rate which is substantially independent of said resistance value over a predetermined range thereof.

* * * * *